UNITED STATES PATENT OFFICE.

JUDSON A. DE CEW, OF MONTREAL, QUEBEC, CANADA.

PROCESS OF MAKING AN ADHESIVE FROM WASTE SULFITE LIQUOR.

1,203,856.  Specification of Letters Patent.  Patented Nov. 7, 1916.

No Drawing.  Application filed February 17, 1913.  Serial No. 748,989.

*To all whom it may concern:*

Be it known that I, JUDSON A. DE CEW, of the city of Montreal, in the Province of Quebec and Dominion of Canada, have invented certain new and useful Improvements in Processes of Making an Adhesive from Waste Sulfite Liquor, of which the following is a full, clear, and exact description.

This invention relates to the product obtained from the concentration of waste sulfite liquor and magnesia.

The primary object of my invention is to form a cementing agent consisting in concentrating waste sulfite liquor in the presence of magnesium oxid and adding thereto magnesium chlorid to form magnesium oxychlorid.

Various methods have been used in treating waste sulfite liquor, and a variety of products have been prepared having chemical decompositions resulting from the methods employed and the material used. The present practice in the trade by those utilizing this material is to evaporate the waste sulfite liquor *in vacuo*, either while in its acid condition or after it has been neutralized with lime or soda. When evaporated in the acid condition, the decomposition takes place with the liberation of free sulfurous acid and sulfite of lime. When evaporated with an excess of alkali, decompositions take place with the combination of the organic matter present with the free alkali. For instance, caustic lime seems to combine in almost any proportion, when added in excess, and finally will form an insoluble product.

My invention consists in the production of a material in which a weak base in excess is used to neutralize with these organic materials, which base will not form the insoluble and unsatisfactory products obtained by means of caustic lime or soda. According to my process, I treat the dilute waste sulfite liquor with oxid of magnesia in excess and concentrate the material *in vacuo* in presence of this excess magnesia. The action of any small quantity of lime that might be present in the magnesia is prevented by burning the magnesite until MgO is formed, leaving the calcium carbonate unburned. The waste liquor used for this purpose is preferably that in which large quantities of magnesia are already combined with it, resulting from the use of magnesia as a base in the manufacture of sulfite pulp.

The product obtained by concentrating this material in the presence of an excess of magnesium oxid has different properties than anything heretofore produced. Certain decompositions take place during the concentration, but this serves to improve the product and cannot go sufficiently far to form insoluble compounds. After concentration or during the final part of the treatment, I add to this material certain quantities of chlorid of magnesia in equivalent molecular proportion to the amount of magnesia remaining in excess. Under ordinary conditions, magnesium oxid and magnesium chlorid combine in molecular proportion to form magnesium oxychlorid, which is a well known cementing material. This reaction takes place in the presence of concentrated waste sulfite liquor prepared by this process when the product is allowed to dry.

By this process, I obtain a cementing material which is more strongly adhesive than anything heretofore obtained.

My method of carrying out this process is as follows: Weak sulfite liquor is treated with magnesium oxid in excess, the magnesia being added preferably in a finely powdered condition. With the excess MgO still in suspension the mixture is evaporated preferably in a vacuum pan, and during the evaporation magnesium chlorid $MgCl_2$ is added in sufficient quantity to react with the MgO in suspension, to form $Mg_2OCl_2$. The product is removed from the pan in a concentrated condition and on drying will act as a binder or hardening agent, with special properties as the result of the chemical actions described.

Having thus described my invention, what I claim is:—

1. The process of making a cementing agent consisting in concentrating waste sulfite liquor in the presence of excess magnesium oxid and adding thereto magnesium chlorid to form magnesium oxychlorid.

2. The process of making a cementing agent consisting in concentrating waste sulfite liquor in the presence of an excess of magnesium oxid and adding thereto certain quantities of magnesium chlorid in equivalent molecular proportions to the amount of magnesia remaining in excess to form magnesium oxychlorid.

3. The process of making a cementing agent consisting in treating concentrated waste sulfite liquor with oxid of magnesia in excess and concentrating the material *in vacuo* in the presence of this excess magnesia and adding thereto magnesium chlorid in equivalent molecular proportion to the amount of magnesia remaining in excess to form magnesium oxychlorid.

In witness whereof I have hereunto set my hand in the presence of two witnesses.

JUDSON A. DE CEW.

Witnesses:
STUART R. W. ALLEN,
G. M. MORELAND.